United States Patent
Kandil et al.

(10) Patent No.: US 6,838,779 B1
(45) Date of Patent: Jan. 4, 2005

(54) AIRCRAFT STARTER GENERATOR FOR VARIABLE FREQUENCY (VF) ELECTRICAL SYSTEM

(75) Inventors: Magdy A. Kandil, Rockford, IL (US); Keith R. Magnus, Belvidere, IL (US); Don Baker, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 84 days.

(21) Appl. No.: 10/178,759

(22) Filed: Jun. 24, 2002

(51) Int. Cl.[7] .................. F02N 11/04; F02N 11/00; F02N 11/14; H02P 3/00; H02P 9/06
(52) U.S. Cl. .................. 290/31; 290/7; 322/10
(58) Field of Search .................. 290/7, 31; 322/10

(56) References Cited

U.S. PATENT DOCUMENTS

| | | | | |
|---|---|---|---|---|
| 3,577,002 A | | 5/1971 | Hall et al. .................. 290/46 |
| 3,596,105 A | | 7/1971 | Segrest .................. 290/46 |
| 3,675,117 A | * | 7/1972 | Reimers .................. 322/31 |
| 3,786,696 A | * | 1/1974 | Aleem .................. 475/77 |
| 3,902,073 A | * | 8/1975 | Lafuze .................. 290/46 |
| 3,937,974 A | | 2/1976 | Lafuze .................. 290/46 |
| 3,983,693 A | | 10/1976 | Werner .................. 60/39.14 |
| 4,093,869 A | | 6/1978 | Hoffmann et al. .................. 290/31 |
| 4,139,780 A | | 2/1979 | Hucker et al. .................. 307/86 |
| 4,217,538 A | | 8/1980 | Ziemacki .................. 322/29 |
| 4,282,443 A | | 8/1981 | Seidl .................. 290/1 R |
| 4,315,442 A | | 2/1982 | Cordner .................. 74/687 |
| 4,330,743 A | * | 5/1982 | Glennon .................. 322/10 |
| 4,353,444 A | | 10/1982 | Bionaz .................. 192/3.29 |
| 4,401,938 A | | 8/1983 | Cronin .................. 322/29 |
| 4,426,585 A | | 1/1984 | Bigalke .................. 290/38 B |
| 4,456,830 A | | 6/1984 | Cronin .................. 290/27 |
| 4,473,752 A | | 9/1984 | Cronin .................. 290/38 R |
| 4,481,459 A | * | 11/1984 | Mehl et al. .................. 322/10 |
| 4,576,265 A | | 3/1986 | Kumura et al. .................. 477/95 |
| 4,587,436 A | | 5/1986 | Cronin .................. 307/21 |
| 4,695,776 A | | 9/1987 | Dishner et al. .................. 318/14 |
| 4,697,090 A | | 9/1987 | Baker et al. .................. 290/4 R |
| 4,708,030 A | * | 11/1987 | Cordner .................. 475/296 |
| 4,724,331 A | * | 2/1988 | Nordlund .................. 290/38 R |
| 4,733,155 A | * | 3/1988 | Smith .................. 322/10 |
| 4,743,776 A | | 5/1988 | Baehler et al. .................. 290/31 |
| 4,743,777 A | | 5/1988 | Shilling et al. .................. 290/46 |

(List continued on next page.)

FOREIGN PATENT DOCUMENTS

| | | |
|---|---|---|
| EP | 0 478 225 A2 | 4/1992 |
| EP | 0 789 144 A2 | 8/1997 |
| EP | 0 789 144 A3 | 8/1998 |

*Primary Examiner*—Nicholas Ponomarenko
*Assistant Examiner*—Pedro J. Cuevas
(74) *Attorney, Agent, or Firm*—Carlsbad, Gaskey & Olds

(57) ABSTRACT

A starter-generator for an aircraft engine comprises a variable dynamoelectric machine alternatively operable as a motor or as a generator, having a rotor. A support motor is coupled to the variable dynamoelectric machine to assist the machine. A torque converter selectively couples and decouples the rotor to the engine, coupling the rotor to the engine at some point when the dynamoelectric machine is operated as a motor. The engine may be started by the dynamoelectric machine when operated as a motor through a first power train including the torque converter and may drive the dynamoelectric machine as a generator through a second power train.

20 Claims, 3 Drawing Sheets

U.S. PATENT DOCUMENTS

| | | | |
|---|---|---|---|
| 4,748,337 A | 5/1988 | Raad et al. ............... 290/31 |
| 4,772,802 A | 9/1988 | Glennon et al. ........... 290/31 |
| 4,786,852 A | 11/1988 | Cook ...................... 322/10 |
| 4,803,376 A | 2/1989 | N'Guyen ................. 290/22 |
| 4,862,009 A | 8/1989 | King ....................... 290/22 |
| 4,888,493 A | 12/1989 | Fluegel ................... 290/4 C |
| 4,922,119 A | 5/1990 | Raad et al. ............... 290/31 |
| 4,967,096 A | 10/1990 | Diemer et al. ............ 307/19 |
| 5,013,929 A | 5/1991 | Dhyanchand ............ 290/31 |
| 5,023,537 A | 6/1991 | Baits ....................... 318/732 |
| 5,028,803 A | 7/1991 | Reynolds ................. 290/31 |
| 5,036,267 A * | 7/1991 | Markunas et al. ........ 322/10 |
| 5,037,353 A | 8/1991 | Suzuki et al. ............. 464/127 |
| 5,055,700 A | 10/1991 | Dhyanchand ............ 290/31 |
| 5,055,764 A * | 10/1991 | Rozman et al. ........... 322/10 |
| 5,077,485 A | 12/1991 | Rashid ..................... 307/84 |
| 5,097,140 A | 3/1992 | Crall ....................... 290/36 R |
| 5,126,582 A | 6/1992 | Sugiyama ................ 290/46 |
| 5,132,604 A | 7/1992 | Shimane et al. .......... 322/10 |
| 5,172,543 A | 12/1992 | White ..................... 60/778 |
| 5,260,642 A | 11/1993 | Huss ....................... 322/51 |
| 5,283,471 A | 2/1994 | Raad ....................... 290/46 |
| 5,309,029 A | 5/1994 | Gregory et al. .......... 290/1 R |
| 5,352,929 A | 10/1994 | Kohl et al. ............... 290/36 R |
| 5,406,189 A | 4/1995 | Wohlberg et al. ........ 322/10 |
| 5,418,400 A | 5/1995 | Stockton .................. 290/46 |
| 5,512,811 A * | 4/1996 | Latos et al. .............. 322/10 |
| 5,546,742 A * | 8/1996 | Shekhawat et al. ...... 60/788 |
| 5,555,722 A | 9/1996 | Mehr-Ayin et al. ...... 60/788 |
| 5,558,175 A | 9/1996 | Sherman .................. 180/65.2 |
| 5,587,647 A | 12/1996 | Bansal et al. ............. 322/45 |
| 5,627,744 A | 5/1997 | Baker et al. .............. 363/165 |
| 5,742,515 A * | 4/1998 | Runkle et al. ............ 700/287 |
| 5,751,070 A | 5/1998 | Nagao et al. ............. 290/46 |
| 5,880,533 A * | 3/1999 | Arai et al. ................ 290/31 |
| 5,927,452 A | 7/1999 | Freise et al. .............. 192/3.52 |
| 5,977,645 A | 11/1999 | Glennon .................. 290/40 F |
| 5,977,648 A | 11/1999 | Seffernick et al. ........ 290/43 |
| 6,008,614 A * | 12/1999 | Imai ........................ 318/700 |
| 6,014,006 A * | 1/2000 | Stuntz et al. ............. 318/804 |
| 6,018,233 A | 1/2000 | Glennon .................. 322/22 |
| 6,037,752 A | 3/2000 | Glennon .................. 322/22 |
| 6,040,634 A | 3/2000 | Larguier .................. 290/45 |
| 6,069,467 A * | 5/2000 | Jansen ..................... 318/802 |
| 6,137,258 A * | 10/2000 | Jansen ..................... 318/802 |
| 6,153,942 A | 11/2000 | Roseman et al. ......... 290/47 |
| 6,163,128 A * | 12/2000 | Hiti et al. ................. 318/722 |
| 6,177,734 B1 | 1/2001 | Masberg et al. .......... 290/31 |
| 6,232,691 B1 | 5/2001 | Anderson ................ 310/179 |
| 6,351,090 B1 * | 2/2002 | Boyer et al. ............. 318/139 |
| 6,354,974 B1 * | 3/2002 | Kozarekar ................ 475/5 |
| 6,364,042 B1 | 4/2002 | Joachim ................... 180/65.2 |
| 6,414,462 B2 * | 7/2002 | Chong ..................... 318/701 |
| 6,424,065 B1 | 7/2002 | Viemmings et al. ...... 310/89 |
| 6,433,506 B1 * | 8/2002 | Pavlov et al. ............ 318/804 |
| 6,481,406 B2 | 11/2002 | Pels ........................ 123/179.3 |
| 6,501,190 B1 | 12/2002 | Seguchi et al. ........... 290/46 |
| 6,561,336 B1 | 5/2003 | Huart et al. .............. 192/70.25 |
| 6,633,099 B2 | 10/2003 | Fulton et al. ............. 310/75 R |
| 6,634,247 B2 | 10/2003 | Pels et al. ................. 74/329 |
| 6,663,527 B2 | 12/2003 | Phelan et al. ............. 475/107 |
| 6,664,652 B2 | 12/2003 | Chane-Waye ............ 290/38 R |
| 6,666,787 B2 | 12/2003 | Doepke .................... 475/5 |
| 6,679,213 B2 * | 1/2004 | Kurita ..................... 123/179.3 |
| 6,683,428 B2 * | 1/2004 | Pavlov et al. ............ 318/432 |
| 6,698,562 B2 | 3/2004 | Teraoka et al. ........... 192/35 |
| 6,699,151 B2 | 3/2004 | Grogg et al. ............. 475/88 |
| 6,700,212 B2 | 3/2004 | Ackermann et al. ...... 290/36 R |
| 6,703,756 B2 * | 3/2004 | Reutlinger ................ 310/254 |
| 6,727,599 B2 * | 4/2004 | Schlangen ................ 290/40 B |

* cited by examiner

AIRCRAFT STARTER GENERATOR FOR VARIABLE FREQUENCY (VF) ELECTRICAL SYSTEM

BACKGROUND OF THE INVENTION

This invention relates to a starter-generator for an aircraft engine, such as a turbine engine.

A turbine engine employed in an aircraft may be started by supplying compressed air to an accessory air turbine motor having reduction gearing to drive the engine. Compressed air is provided by an auxiliary power unit. These pneumatic systems require numerous air ducts, seals and air valves that are not only bulky but heavy. Moreover, these systems add undesirable complexity to the aircraft, reducing reliability and increasing cost for aircraft operators.

Recently, aircraft manufacturers have commenced using electric starters for turbine engines. Such a starter adds little additional componentry and wiring to the aircraft because the starter takes advantage of the aircraft's existing electrical system. Thus, the starter does away with many of the components used to start the engine by compressed air.

One approach to starting a turbine engine electrically is to employ a single dynamoelectric machine that operates as both a starter and a generator. Typically, this machine comprises a rotor and stator that serve the dual function of cranking the engine to start and operating as a generator driven by the turbine engine after start. The machine supports this dual function to eliminate the need for separate machines, associated mounting pads, and gearing on the engine accessory gearbox. One such starter-generator system uses a synchronous generator to operate as an induction motor to start the turbine engine. However, the use of such a device as an induction motor to start the engine creates the risk of damaging the integrity of the device. Potential burning of rotating diodes, very high current through the damper bars and the effect of inrush currents on field windings all pose risks to the device.

One kind of dynamoelectric machine that may be employed as a starter-generator is a variable frequency generator. The generator is used with a variable frequency electrical system of an aircraft that has componentry receptive to electrical voltage at a frequency that may vary with engine speed. Such a system allows the starter-generator to be restarted by an auxiliary power unit or another variable frequency power source, such as from another generator driven by an engine in mid-flight.

The need to avoid overburdening of the variable frequency starter-generator during start-up is of particular importance because of the need to preserve the mid-flight restart capability of the aircraft. That is, a starter-generator burned out by overloading during start-up will not be useful in a restart condition.

A need therefore exists to safeguard the variable frequency dynamoelectric machine during engine start up.

SUMMARY OF THE INVENTION

The present invention employs a variable frequency starter-generator coupled to a support motor, which operates to drive the starter-generator up to an initial synchronous speed.

As known, the starter-generator may operate as both a motor and a generator. In contrast to existing devices, however, a support motor is coupled to the starter-generator accelerate it to a designated synchronous speed. The support motor may also operate as another generator driven by the engine in a power generation mode.

Mechanical linkages may exist between the engine and the starter-generator to reduce the load on the engine or the load on the starter-generator. A torque converter may selectively couple and decouple the starter-generator to the engine. When the starter-generator is operated as a motor, the torque converter permits the starter-generator to rotate the turbine engine. When the starter-generator is operated as a generator, the torque converter decouples the direct connection from the engine to the starter generator. In power generation mode, the starter-generator is driven by the engine and outputs a variable frequency electric current to the electrical system of the aircraft. The support motor may be a permanent magnet generator, which may also serve to generate electricity for the aircraft.

The torque converter may decouple the starter-generator from the engine until such time that the starter-generator has reached a specific speed. Upon reaching this speed, the torque converter may then couple the engine to the starter-generator. The support motor assists the starter-generator in reaching this predetermined speed. A control unit sensing the speed of the starter-generator and engine may serve to control the torque converter via a proportional flow control valve.

Another mechanical linkage may operate to decouple the engine from the torque converter when the rotational speed of the turbine engine, once started, outpaces the speed of the torque converter as driven by the starter-generator. Another linkage may decouple the engine from the starter-generator when during start mode the rotational speed of the starter-generator outpaces the speed of the engine. In addition, the support motor may be powered by its own power supply. The starter-generator may be powered by a second power source which switches on when the starter-generator reaches a predetermined speed.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
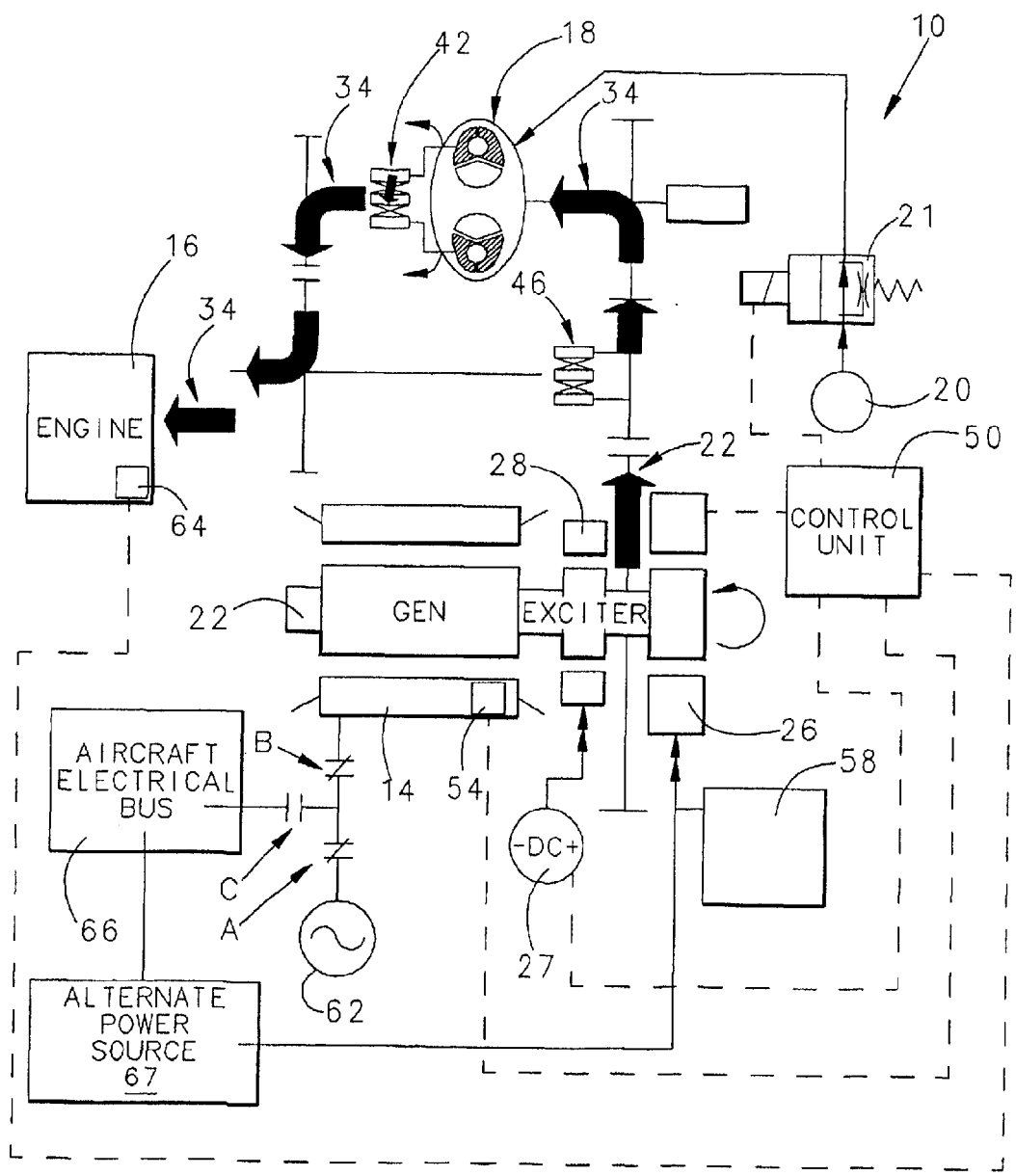
FIG. 1 illustrates a schematic representation of the invention, showing the flow of mechanical power during engine start.

FIG. 1 illustrates a schematic representation of the inventive starter-generator 10. Like existing starter-generators, inventive starter-generator 10 employs dynamoelectric machine 14, which operates as both a motor and a generator. Dynamoelectric machine is a variable frequency generator having rotor 22, which turns when the field windings of dynamoelectric machine 14 are charged by an alternating current from a power source. Support motor 26, such as a permanent magnet motor and generator, is mechanically linked to rotor 22 to accelerate it to a designated synchronous speed. Thus, as support motor 26 turns so too does rotor 22 of dynamoelectric machine 14.

Torque converter 18 may selectively couple and decouple the movement of rotor 22 to engine 16, such as a turbine engine for an aircraft. Torque converter 18 may be a hydraulic torque converter, which when filled with hydraulic fluid from hydraulic source 20 provides a coupling between rotor 22 and engine 16. As known, hydraulic source 20 includes a reservoir of hydraulic fluid that may pass to torque converter 18 through proportional flow control valve 21. Then, rotor 22 drives engine 16 to turn. When hydraulic fluid is discharged from torque converter 18, rotor 22 is decoupled from engine 16. Accordingly, in this state, rotor 22 will not drive engine 16.

When torque converter is decoupled, dynamoelectric machine 14 may commence operation as a generator. Engine 16 is mechanically linked to dynamoelectric machine 14 through coupling 46. Couplings 42 and 46 permit the reduction of drag caused by components of starter-generator 10 during various modes of operation. Coupling 42 provides a mechanical link between torque converter 18 and engine 16 such that engine 16 is driven by torque converter 18 when filled with hydraulic fluid as long as the speed of torque converter 18 exceeds the speed of engine 16. However, once the speed of engine 16 exceeds the speed of torque converter 18, coupling 42 decouples engine from torque converter 18 by permitting engine 16 to overrun torque converter 18. For example, when engine 16 has reached a self-sustaining speed, it may overrun torque converter 18. Thus, coupling 42 limits torque converter 18 from creating a load on engine 16. Coupling 42 may be an overrunning clutch.

Coupling 46 provides a mechanical link between engine 16 and rotor 22. The linkage is such that rotor 22 is coupled to engine 16 as long as the output speed of engine 16 exceeds the speed of torque converter 18. If the speed of rotor 22 exceeds the output speed of engine 16, such as during start-up, then coupling 46 decouples engine 16 from rotor 22, allowing rotor 22 to overrun engine 16. In this way, engine 16 does not load dynamoelectric machine 14 during start up at coupling 46. Coupling 46 may also be an overrunning clutch.

FIG. 1 illustrates the workings of these foregoing components at the initiation of start mode of engine 16. Specifically, power is supplied to support motor 26 by first power source 58, which may be an alternating current from a three phase inverter supplied to support motor 26. Support motor 26 may be a permanent magnet motor and generator. Support motor 26 may be controlled by control unit 50. Control unit 50 may oversee operation of support motor 26. A DC source 27 may supply power to exciter 28 to operate dynamoelectric machine 14. DC source 27 may be integrated into control unit 50 or it may just communicate with control unit 50 to oversee operation of exciter 28. Support motor 26 turns rotor 22 of dynamoelectric machine 14, assisting its start-up by accelerating dynamoelectric machine 14 to close to synchronous frequency of the second power source 62, say 400 Hz. This acceleration overcomes accessory and gear train drag. At synchronous speed, such as 400 hertz, dynamoelectric machine 14 may then receive power from second power source 62, such as a three phase 115 volt alternating current power supply from an auxiliary power unit or a ground cart, through electrical switch A and electrical switch B, which are closed to permit current to flow from second power source 62 to dynamoelectric machine 14. Second power source 62 may operate at 400 hertz and then continue to drive dynamoelectric machine 14 as a synchronized motor at this speed. Control unit 50 may turnoff power to support motor 26.

Sensor 54 senses speed of dynamoelectric machine 14. Once dynamoelectric machine reaches a predetermined speed, say 400 hertz, control unit 50, which is in communication with sensor 54, then instructs proportional flow control valve 21 to commence filling torque converter 18 with hydraulic fluid from hydraulic source 20. As hydraulic fluid begins to fill torque converter 18, torque converter 18 begins to rotate engine 16 through first coupling 42, creating power train 34. Once engine 16 reaches a self-sustaining speed, it will outpace the speed of torque converter 18. Coupling 42 permits this event to happen without significant drag on engine 16, as explained above, by allowing engine 16 to overrun torque converter 18.

Engine sensor 64 senses when engine 16 has reached a self-sustaining speed. Engine sensor 64 may be part of engine 16 or in communication with the output of engine 16, or it may be integrated into the input shaft of the starter drive generator. When such a condition is sensed, control unit 50 then discharges hydraulic fluid from torque converter 18 decoupling rotor 22 from engine 16. Hydraulic fluid is returned to hydraulic source 20. Power from second power source 62 is disconnect at electrical switch A.

Figure 2:
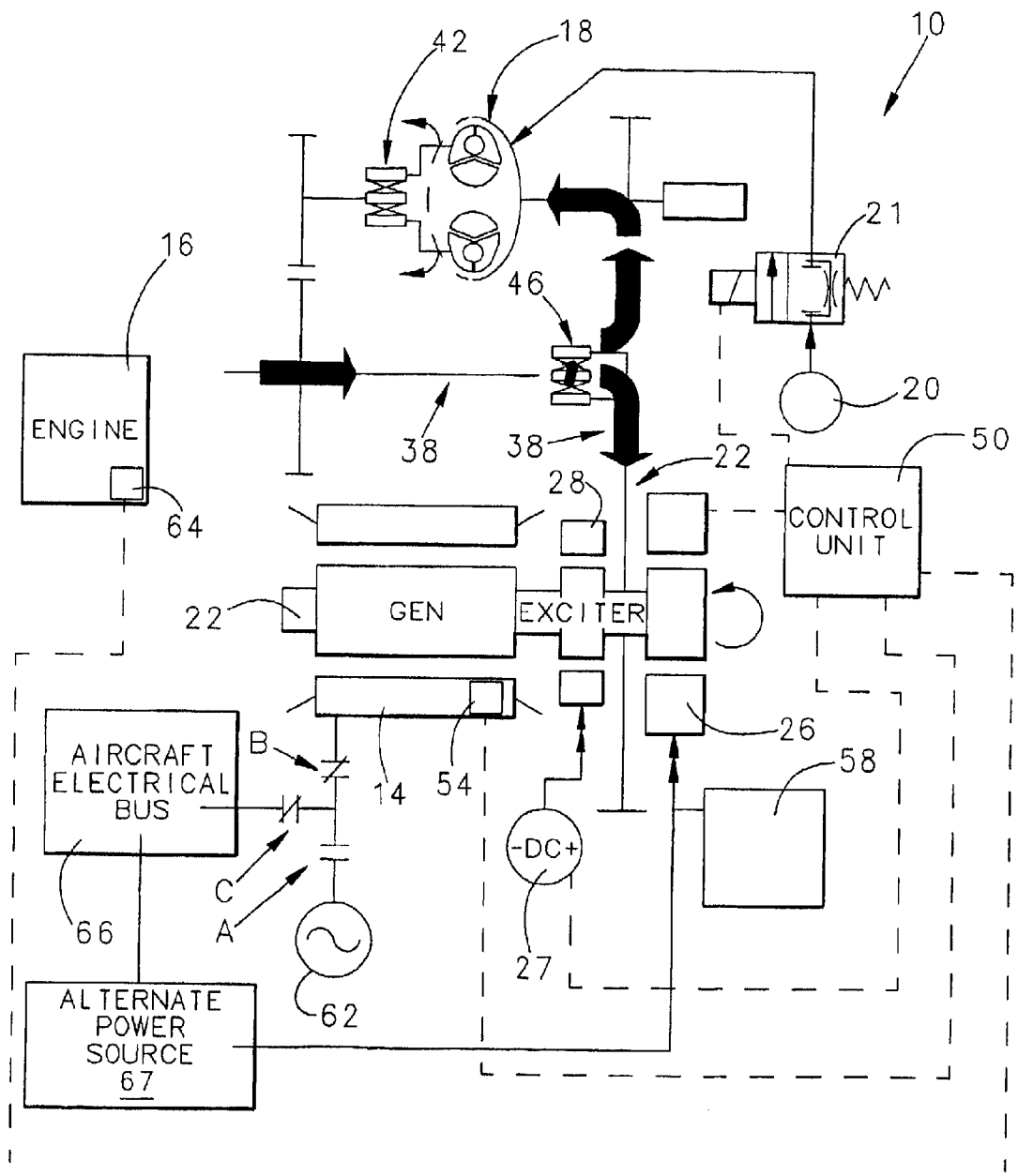
FIG. 2 illustrates the flow of mechanical power of the invention of FIGS. 1 and 2, showing the flow of mechanical power in power generation mode.

As shown in FIG. 2, engine 16 then serves to drive dynamoelectric machine 14 through second coupling 46, which drives rotor 22, creating power train 38. The engine 16 forms a power train with second coupling 46 and rotor 22 for a power generation mode of operation. Dynamoelectric machine 14 is thus driven to generate electric power at a frequency related to speed of engine 16. This variable frequency power is then directed to aircraft electrical bus 66 by closing switch C and opening switch A, which supplies alternating current electrical power to electrical components of the aircraft at variable frequency of engine 16. Moreover, support motor 26, a permanent magnet generator, may also supply power to control circuitry due to its mechanical link with dynamoelectric machine 14. Such power may be passed through a voltage regulator of a general control unit of the aircraft. Power supplied to exciter 28 may be varied by the voltage regulator to control the output voltage.

Figure 3:
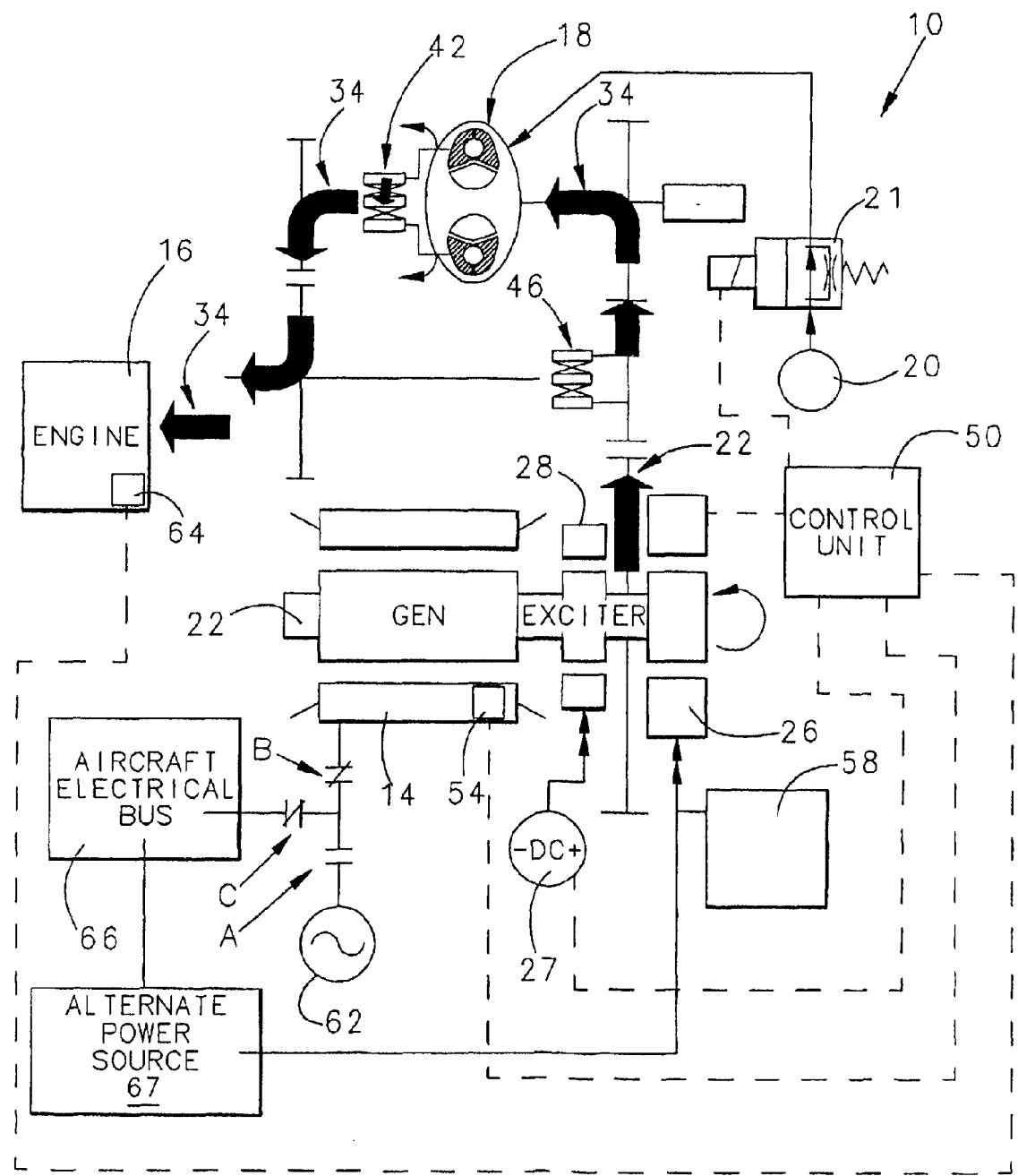
FIG. 3 illustrates a schematic representation of the invention during in-flight start mode.

As shown in FIG. 3, the inventive starter-generator is also capable of in-flight start. In the event of engine 16 stall, alternative power source 67 is in communication with aircraft electrical bus 66 and may supply electrical power through bus 66 and closed electrical switches C and B. Alternative power source 67 may be an on-board auxiliary power unit or a variable frequency power source, such as the electrical output of another variable frequency generator driven by another engine connected to the same bus. In the event the alternative power source 67 is a 400 Hz auxiliary power unit, then the start sequence is the same as described above.

However, in the event alternative power source 67 is a variable frequency source, say 400 to 800 Hz, such as from aircraft bus, then support motor 26 accelerates dynamoelectric machine 14 to frequency of the variable frequency source. If this frequency, as sensed by speed sensor 54, exceeds a certain frequency desired for turning engine 16, say 400 Hz, then control unit 50 operates proportional flow control valve 21 to partially fill torque converter 18 so that torque converter 18 turns engine 16 to self-sustaining speed. Partial filling of torque converter 18 is controlled in a manner so if the frequency from alternative power source 67 exceeds the desired frequency, say 400 Hz, torque converter 18 supplies the sane mechanical power to engine 16 achieved with a speed equivalent to the desired frequency, say 400 Hz. This is important to limit high driving power requirements and as such avoid high loads, intense heating up of the oil and detrimental effects upon actuated engine. Known techniques exist for determining the exact amount of the filling of torque converter 18 required to ensure maintenance of the desired frequency given the speed sensed by sensor 54.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A starter-generator for an engine comprising:
    a variable frequency dynamoelectric machine alternatively operable as a motor or as a generator, said variable frequency dynamoelectric machine having a rotor
    a torque converter for selectively coupling and decoupling said rotor to an aircraft engine, said torque converter for coupling said rotor to the engine when said variable frequency dynamoelectric machine is operated as a motor,
    a coupling for interconnecting said rotor and the engine at about the same speed when said rotor and the engine are coupled and operating to decouple said rotor from the engine for a speed of said rotor greater than a speed of the engine; and
    wherein the engine (a) may be started by said variable frequency dynamoelectric machine when operated as a motor through a first power train including said torque converter and (b) may drive said variable frequency dynamoelectric machine as a generator to create an electrical output of a frequency varying with the speed of the engine through a second power train including said coupling.

2. The starter-generator of claim 1 including a support motor coupled to said variable frequency dynamoelectric machine for assisting said variable frequency dynamoelectric machine.

3. The starter generator of claim 1 including an electrical device operable by said electrical output.

4. The starter generator of claim 1 including a variable frequency electrical source in communication with said variable frequency dynamoelectric machine for driving said variable frequency dynamoelectric machine as a motor.

5. The starter generator of claim 1 wherein said torque converter decouples said rotor from said engine until said variable frequency dynamoelectric machine reaches a predetermined speed and couples said rotor to said engine after reaching said predetermined speed.

6. The starter generator of claim 5 wherein a support motor assists said variable frequency dynamoelectric machine in reaching said predetermined speed.

7. The starter generator of claim 1 wherein said torque converter decouples said rotor from said engine when said variable frequency dynamoelectric machine is operated as a generator.

8. The starter generator of claim 1 wherein a support motor comprises a permanent magnet motor.

9. The starter generator of claim 8 wherein said permanent magnet motor comprises a generator.

10. The starter generator of claim 1 including a control unit controlling said torque converter.

11. A starter-generator for an engine comprising:
    a variable frequency dynamoelectric machine alternatively operable as a motor or as a generator, said variable frequency dynamoelectric machine having a rotor;
    a torque converter for selectively coupling and decoupling said rotor to an aircraft engine, said torque converter for coupling said rotor to an engine when said variable frequency dynamoelectric machine is operated as a motor;
    a support motor coupled to said variable frequency dynamoelectric machine for assisting said variable frequency dynamoelectric machine in reaching a predetermined speed;
    a first coupling for interconnecting the engine and said torque converter and operating to decouple the engine from said torque converter for a speed of the engine greater than a speed of said torque converter;
    a second coupling for interconnecting said rotor and the engine at about the same speed when said rotor and the engine arm coupled and operating to decouple said rotor from said engine for a speed of said rotor greater than the speed or the engine;
    wherein the engine (a) may be started by said variable frequency dynamoelectric machine when operated as a motor through a first power train including said torque converter and said first coupling and (b) may drive said variable frequency dynamoelectric machine as a generator to create an electrical output of a frequency varying with the speed of the engine through a second power train including said second coupling; and
    wherein said torque converter decouples said rotor from said engine until said variable frequency dynamoelectric machine reaches said predetermined speed and couples said rotor to said engine after reaching said predetermined speed.

12. The starter generator of claim 11 including an electrical device operable by said electrical output.

13. The starter generator of claim 11 including a variable frequency electrical source in communication with said dynamoelectric machine for driving said variable frequency dynamoelectric machine as a motor.

14. The starter generator of claim 11 wherein said torque converter decouples said rotor from said engine when said variable frequency dynamoelectric machine is operated as a generator.

15. The starter generator of claim 11 wherein said support motor comprises an permanent magnet motor.

16. The starter generator of claim 11 including a proportional flow control valve controlling a flow of hydraulic fluid from a hydraulic source to said torque converter.

17. The starter generator of claim 1 wherein said torque converter comprises a hydraulic torque converter.

18. The starter generator of claim 17 wherein said torque converter has a hydraulically charged condition and a hydraulically discharged condition, said torque converter coupling said rotor to the engine in said hydraulically charged condition and decoupling said rotor from the engine in said hydraulically discharged condition.

19. The starter generator of claim 11 including a control unit for controlling said torque converter.

20. The starter generator of claim 11 including a control unit for controlling power to said variable frequency dynamoelectric machine and said support motor.

* * * * *

UNITED STATES PATENT AND TRADEMARK OFFICE
CERTIFICATE OF CORRECTION

PATENT NO. : 6,838,779 B1
DATED : January 4, 2005
INVENTOR(S) : Kandil et al.

It is certified that error appears in the above-identified patent and that said Letters Patent is hereby corrected as shown below:

Column 6,
Line 22, "arm" should read -- are --.

Signed and Sealed this

Nineteenth Day of April, 2005

JON W. DUDAS
*Director of the United States Patent and Trademark Office*